(12) United States Patent
Turnbow (10) Patent No.: US 8,276,965 B2
(45) Date of Patent: Oct. 2, 2012

(54) SPACE SAVING AUTOMOBILE LOADING RAMP SYSTEM

(76) Inventor: Howard M. Turnbow, Pearl, MS (US)

( * ) Notice: Subject to any disclaimer, the term of this patent is extended or adjusted under 35 U.S.C. 154(b) by 291 days.

(21) Appl. No.: 12/703,830

(22) Filed: Feb. 11, 2010

(65) Prior Publication Data

US 2011/0193366 A1 Aug. 11, 2011

(51) Int. Cl.
B60P 1/43 (2006.01)
(52) U.S. Cl. .......... 296/26.1; 296/61; 414/537; 414/462
(58) Field of Classification Search ............... 414/537, 414/462; 296/26.08, 26.09, 26.1, 37.6, 61, 296/62
See application file for complete search history.

(56) References Cited

U.S. PATENT DOCUMENTS

| | | | | |
|---|---|---|---|---|
| 749,187 | A * | 1/1904 | Hanlon | 296/58 |
| 4,874,284 | A | 10/1989 | New, Jr. | |
| 4,944,546 | A | 7/1990 | Keller | |
| 4,990,049 | A | 2/1991 | Hargrove | |
| 5,380,145 | A * | 1/1995 | Czaplewski | 414/537 |
| 5,538,307 | A * | 7/1996 | Otis | 296/61 |
| 5,553,762 | A | 9/1996 | Brown | |
| 5,645,394 | A | 7/1997 | Hays | |
| 5,649,732 | A | 7/1997 | Jordan | |
| 5,907,276 | A | 5/1999 | Lance | |
| 6,059,344 | A | 5/2000 | Radosevich | |
| D430,377 | S | 8/2000 | Collins | |
| 6,227,593 | B1 | 5/2001 | De Valcourt | |
| 6,524,055 | B1 | 2/2003 | Overbye | |
| 6,533,337 | B1 | 3/2003 | Harshman | |
| 6,536,822 | B1 | 3/2003 | Vagedes | |
| 6,616,208 | B1 | 9/2003 | Bauer | |
| 6,634,848 | B2 | 10/2003 | Henderson | |
| 6,746,068 | B1 | 6/2004 | Hurd | |
| 6,913,305 | B1 | 7/2005 | Kern | |
| 6,948,755 | B1 | 9/2005 | Bauer | |
| 6,991,277 | B1 | 1/2006 | Esler | |
| 7,070,220 | B1 | 7/2006 | Lantaigne | |
| 7,128,357 | B1 | 10/2006 | Carroll | |
| 7,179,042 | B1 | 2/2007 | Hartmann | |
| 7,192,240 | B2 | 3/2007 | Aulicino | |
| 7,309,202 | B1 | 12/2007 | Anderson | |
| 7,344,184 | B2 | 3/2008 | Salvador | |
| 7,350,255 | B2 | 4/2008 | Zhang | |
| 7,445,268 | B2 | 11/2008 | Faulkiner | |
| 7,488,025 | B1 | 2/2009 | Roberson | |
| 7,533,923 | B1 | 5/2009 | Caldwell | |
| 7,549,692 | B2 | 6/2009 | Washington | |
| 2006/0191769 | A1* | 8/2006 | Stotts | 193/5 |
| 2008/0292438 | A1 | 11/2008 | Patterson | |

* cited by examiner

*Primary Examiner* — Dennis Pedder
(74) *Attorney, Agent, or Firm* — Brandt D. Howell (57) ABSTRACT

A space saving automobile loading ramp system is disclosed. The present invention attaches to the hitch of a truck or similar automobile to allow the user to load cargo. The present invention does not require any alteration of the automobile. Additionally, the present invention does not take up any space in a truck bed or require components be stored in the cab, and can be disassembled for transport while the tailgate of the truck remains down even if cargo has been loaded onto the tailgate using the present invention.

17 Claims, 6 Drawing Sheets

SPACE SAVING AUTOMOBILE LOADING RAMP SYSTEM

FIELD OF THE INVENTION

This invention relates generally to devices for loading cargo into automobiles and specifically to automobile loading ramps that can be used to load cargo and then easily disassembled and stored to maintain optimal cargo space.

BACKGROUND OF THE INVENTION

Modern pickup trucks are capable of storing and transporting multiple types of all terrain vehicles, yard maintenance vehicles, motorcycles, jet skis, snowmobiles, and the like. However, such vehicles and similar cargo are too heavy to be lifted into the truck's bed, which is typically suspended several feet from the ground. Many cargo ramps have been developed to allow the user to roll the vehicles from the ground and into the bed of the truck.

Some of the previously developed ramps are foldable or retractable and take the place of the trucks tailgate. The drawback to these ramps is that the original tailgate of the truck must be removed, which can decrease the structural integrity of the truck bed walls and cause the vehicle to develop permanent alignment problems. Others fold up or break down to be stored in the trucks bed along with the cargo. These designs force the user to give up some of the trucks cargo space for the ramp. Many designs also require several tools to assemble and disassemble. For those designs, the user must also give up storage space to transport the appropriate tools.

Still other ramps can be attached to the sidewalls of the truck, but such ramps require the truck be permanently modified to accept them. Others increase the truck bed length or store the cargo above the truck bed which can significantly shift the vehicles center of gravity and increase the potential for accidents, both during the cargo loading process and during transit. Many of the abovementioned designs also connect to the truck bed instead of directly connecting to the truck frame. This can cause damage to the truck bed when heavy cargo is loaded.

Therefore, what is needed is a space saving automobile loading ramp. The space saving automobile loading ramp system should attach directly to the frame of the automobile without the need of modifications to the automobile, should not take up space in the bed of the automobile, should require no tools to assemble and disassemble, and should not alter to automobiles center of gravity. Furthermore, other desirable features and characteristics of the present invention will become apparent when this background of the invention is read in conjunction with the subsequent detailed description of the invention, appended claims, and the accompanying drawings.

SUMMARY OF THE INVENTION

The present invention advantageously fills the aforementioned deficiencies by providing a space saving automobile loading ramp. The space saving automobile loading ramp system attaches to the automobiles frame by way of the automobiles receiver hitch, requires no modifications to the vehicle, does not take up the vehicles bed space when in use, requires no tools for assembly, and does not alter the vehicles center of gravity.

The present invention now will be described more fully hereinafter with reference to the accompanying drawings, which are intended to be read in conjunction with both this summary, the detailed description, and any preferred and/or particular embodiments specifically discussed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The drawings contained herein exemplify one of the embodiments of the claimed invention. The invention is not limited to the embodiment shown. The embodiment shown is purely an example, and the invention is capable of many variations of said embodiment. In the drawings.

The first digit of each reference numeral in the above figures indicates the figure in which an element or feature is most prominently shown. The second digit indicates related elements or features, and a final letter (when used) indicates a sub-portion of an element or feature.

DETAILED DESCRIPTION OF THE INVENTION

Figure 1:
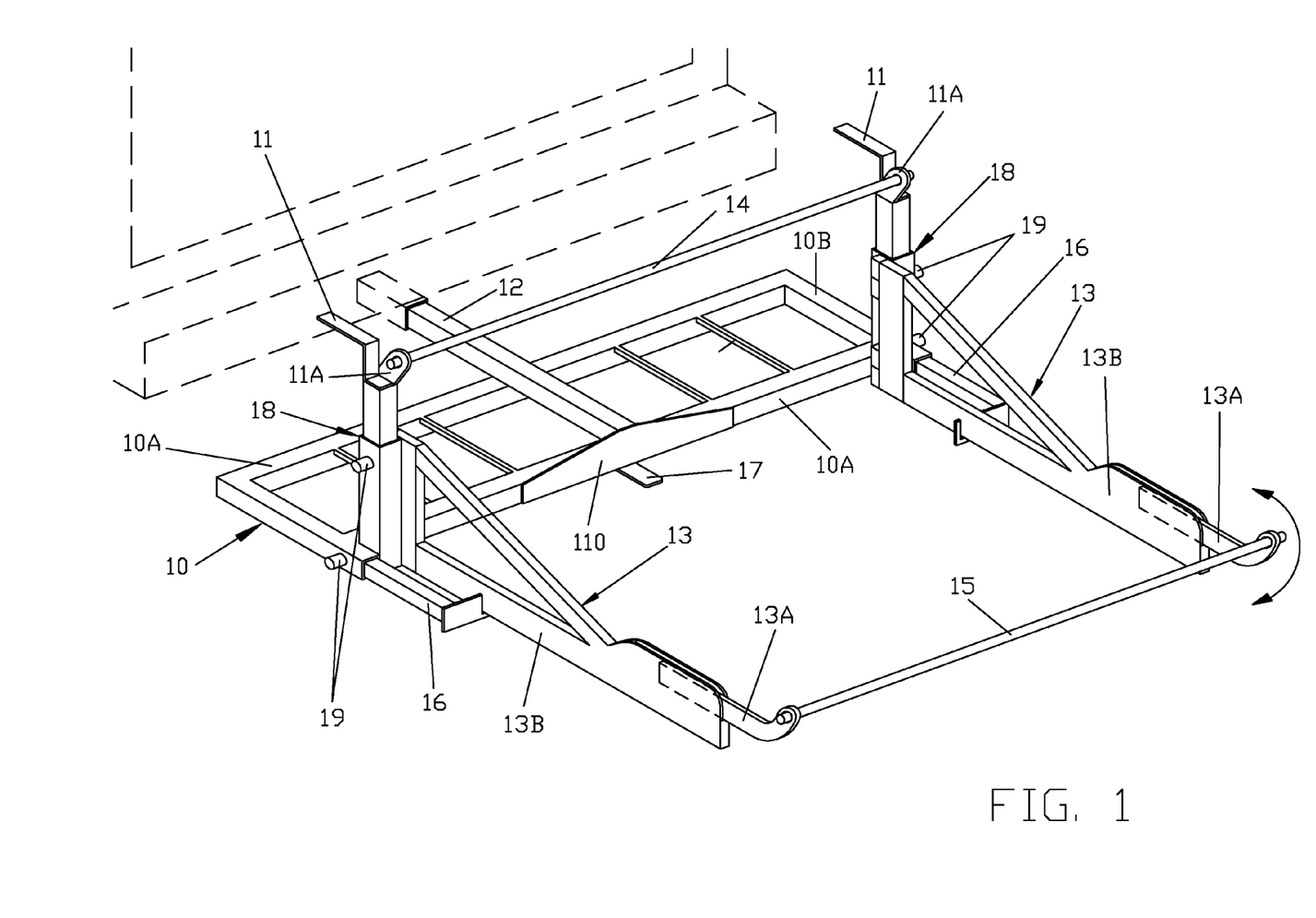
FIG. 1 illustrates a perspective view of the structural support system of the present invention in the open position.

FIG. 1 illustrates a perspective view of the structural support system of the present invention in the open position. FIG. 1 discloses, among other components, a storage bed unit 10. The purpose of the storage bed unit 10 is to act as a structural support for the rest of the device. The storage bed unit 10 is also capable of storing the other device components when the device is disassembled for transit.

The storage bed unit 10 further comprises a vehicle attachment member 12 which is capable of being releaseably attached to a pickup truck or other automobile. The vehicle attachment member further comprises a proximate end and a distal end. In the preferred embodiment, the distil end of the vehicle attachment member 12 can be releaseably attached to the receiver hitch of a pickup truck. The vehicle attachment member 12 serves the function of attaching the present invention to the pickup truck frame so that the truck supports the weight of the present invention and any cargo stored therein or thereon. For the purposes of this disclosure, releaseably attached means one component may be securely and temporarily attached to another component, but may be removed by the user as needed. The components in this disclosure attach via the use of locking pins, by sliding one component into another, or both. However, one skilled in the art will recognize that many other attachment means may be used, and the exact method of attachment is generally unimportant so long as the components can remain attached under load pressure and then be removed when desired by the user.

The storage bed unit 10 further comprises a storage base 10A affixed to the vehicle attachment member 12. The storage base 10A serves the function of storing other components of the present invention and serving as a structural support as mentioned above. In the preferred embodiment, the storage base 10A is rectangular prism with a width of approximately five and a half feet, a length of approximately two feet and two inches, and a thickness of approximately three inches. While the storage base 10A may be comprised of a solid plank, in the preferred embodiment, the storage base 10A comprises an outer perimeter of material with support crossbars attaching to both of the sections of the perimeter that run parallel to the tailgate of the automobile. This configuration is beneficial because it reduces the material needed to manufacture the invention, which decreases both the weight of the invention and the manufacturing cost. In the preferred embodiment, the outer perimeter of the storage base is hollow and capable of accepting other components as discussed below. The storage base 10A also comprises two side portions 10B each with an opening to accept other components as discussed further below. In the preferred embodiment, the vehicle attachment member 12 is affixed to top of the storage base 10A; however, one skilled in the art can see that the vehicle attachment member 12 can easily be attached to the bottom of the storage base 10A in an alternate embodiment. This disclosure is intended to, and does, include said alternate embodiment.

In the preferred embodiment, the storage bed unit 10 further comprises a vehicle attachment member support 110. The vehicle attachment member support 110 is a plate that is affixed to the proximate end of the vehicle attachment member 12 and the storage base 10A. The purpose of the vehicle attachment member support 110 is to give extra support between the vehicle attachment member 12 and the storage base 10A.

The storage bed unit 10 further comprises a plurality of vertical support members 18. In the preferred embodiment, the storage bed unit 10 comprises two vertical support members 18. The vertical support members 18 serve the function of providing support to the inventions other components as disclosed below. In the preferred embodiment, each vertical support member 18 is hollow and further comprises a lower portion which is attached to the storage base 10A and an upper portion.

In the preferred embodiment, the vertical support members 18 further comprise a tailgate lock 11. The tailgate lock 11 should be releaseably attached to the upper portion of the vertical support member 18 and should be capable of securing the tailgate of an automobile. In the preferred embodiment, the tailgate lock 11 comprises an L shaped component with a ninety degree angle relative to the vertical support member 18 and said tailgate lock 11 is received into the hollow upper portion of the vertical support member 18. The tailgate lock 11 can be removed to allow the tailgate of the truck can be lowered. The tailgate lock 11 can then be rotated and replaced so that the bent portion of the tailgate lock 11 touches the top of the tailgate and prevents the tailgate from moving. The tailgate lock 11 can then be secured by pins or equivalent means. In the preferred embodiment, the tailgate lock 11 can be completely removed from the vertical support members 18, rotated to the desired position, and replaced. This embodiment is preferred for reasons of increased simplicity and durability. In an alternate embodiment, the tailgate lock 11 is permanently attached to vertical support member 18 and is merely rotated when necessary to raise or lower the tailgate. This embodiment is not preferred because permanent attachment of these two parts increases the weight the user must lift to attach the invention when it is completely disassembled.

In the preferred embodiment, the tailgate lock 11 further comprises a crossbar attachment 11A. This crossbar attachment 11A is used as an attachment mechanism for other components of the present invention as discussed below. In the preferred embodiment, the crossbar attachment 11A is a part of the tailgate lock 11 and can be removed and rotated as discussed above. However, in an alternate embodiment, the crossbar attachment 11A could be permanently attached directly to the upper portion of the vertical support member 18 and thereby remain stationary at all times.

Figure 3:
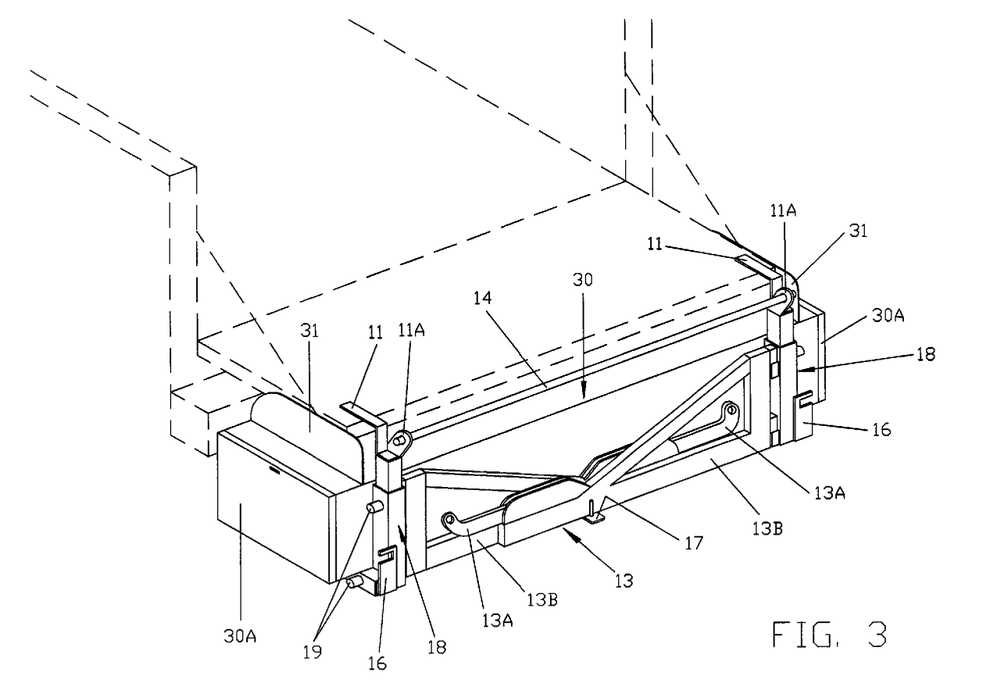
FIG. 3 illustrates a perspective view of the present invention in the closed position when fully disassembled and stored for transit.

FIG. 1 further discloses a plurality of swing arm units 13. Each swing arm unit 13 further comprises a horizontal swing section 13B, which is pivotally connected to one of the vertical support members 18. For the purposes of this disclosure, pivotally connected means that one component is connected to another component in such as way that the first component can pivot and change orientation with relation to the second component. In the preferred embodiment, the swing arm units 13 should be pivotally attached to the vertical support members 18 in such a way that the swing arm units 13 can swing into an open position as shown in FIG. 1 or a closed position as shown in FIG. 3 as discussed below. The open position as defined herein occurs when both swing arm units 13 are placed parallel with the sidewalls of the truck and perpendicular to the bumper. The closed position occurs when the swing arm units 13 are placed parallel to the bumper of the truck and perpendicular to the trucks sidewalls.

In the preferred embodiment, each swing arm unit 13 further comprises a swing arm projection 13A which is pivotally connected to the horizontal swing section 13B. The pivotal connection allows the swing arm projection 13A to pivot in the vertical plane.

FIG. 1 further discloses a primary crossbar 14. The primary crossbar 14 should be capable of being releaseably attached to a plurality of the vertical support members 18. In the preferred embodiment, the primary crossbar 14 is attachable to the crossbar attachment of the tailgate lock 11A. However, in an alternate embodiment, the primary crossbar 14 can be attached to the upper portion of the vertical support member 18. As a mechanical equivalent, the primary crossbar 14 could also be attached to some portions of the swing arm units 13. The only requirement is that the primary crossbar 14 must be positioned parallel to the tailgate of the truck to be loaded and attached in such a way that the wheels of the cargo to be loaded can easily roll from the top of the crossbar to the top of the lowered tailgate of the truck. In the preferred embodiment, the primary crossbar 14 is releaseably attached to the crossbar attachment 11A by sliding the primary crossbar 14 through each crossbar attachment 11A and attaching the crossbar by means of a plurality of pins. However, in alternate embodiments, any mechanical equivalents such as clips, latches, rods, fasteners, and the like may be used.

FIG. 1 further discloses a secondary crossbar 15. The secondary crossbar 15 should be capable of being releaseably attached to a plurality of the swing arm units 13. In the preferred embodiment, the secondary crossbar 15 should be releaseably attachable to the swing arm projections 13A in a similar manner to the attachment of the primary crossbar 14 to the vertical support members 18.

In the preferred embodiment, the storage bed unit 10 further comprises a plurality of support extensions 16. The support extensions 16 further comprise a notch and are attached to and can telescope out of, and be accepted into, the hollow side portion of the storage base 10B. When the swing arm units 13 are in the open position, the support extensions 16 can be extended along the horizontal swing section 13B. This is done in such a way that the horizontal swing sections 13B are contained in the notch of the support extensions 16. When the support extensions 16 are fully extended, the support extensions 16 both provide additional support to each swing arm unit 13 by better distributing the vertical pressure exerted by loads and giving additional support to help prevent the swing arm units 13 from moving in a horizontal plane when horizontal pressure is exerted on the present invention when it is in the open position. The support extensions 16 can be retained in position relative to the storage base 10A as discussed below.

FIG. 1 further discloses a swing arm lock 17. The swing arm lock 17 is attached to the storage base 10A. The swing arm lock 17 should be capable of securing the swing arm units 13 when said swing arm units 13 are in the closed position as shown in FIG. 3 as discussed below.

FIG. 1 further discloses one or more spring loaded attachment pins 19. The purpose of the spring loaded attachment pin 19 is either to releaseably attach certain components of the present invention together or retain certain components in position relative to one another, without requiring the use of additional tools. The exact functionality of the spring loaded attachment pin 19 is discussed in greater detail in connection to FIG. 6. In the preferred embodiment, four spring loaded attachment pins 19 are employed to maintain each support extension 16 in its desired position relative to the storage base 10A and releaseably attach the tailgate locks 11 to the vertical support members 18.

Figure 2:
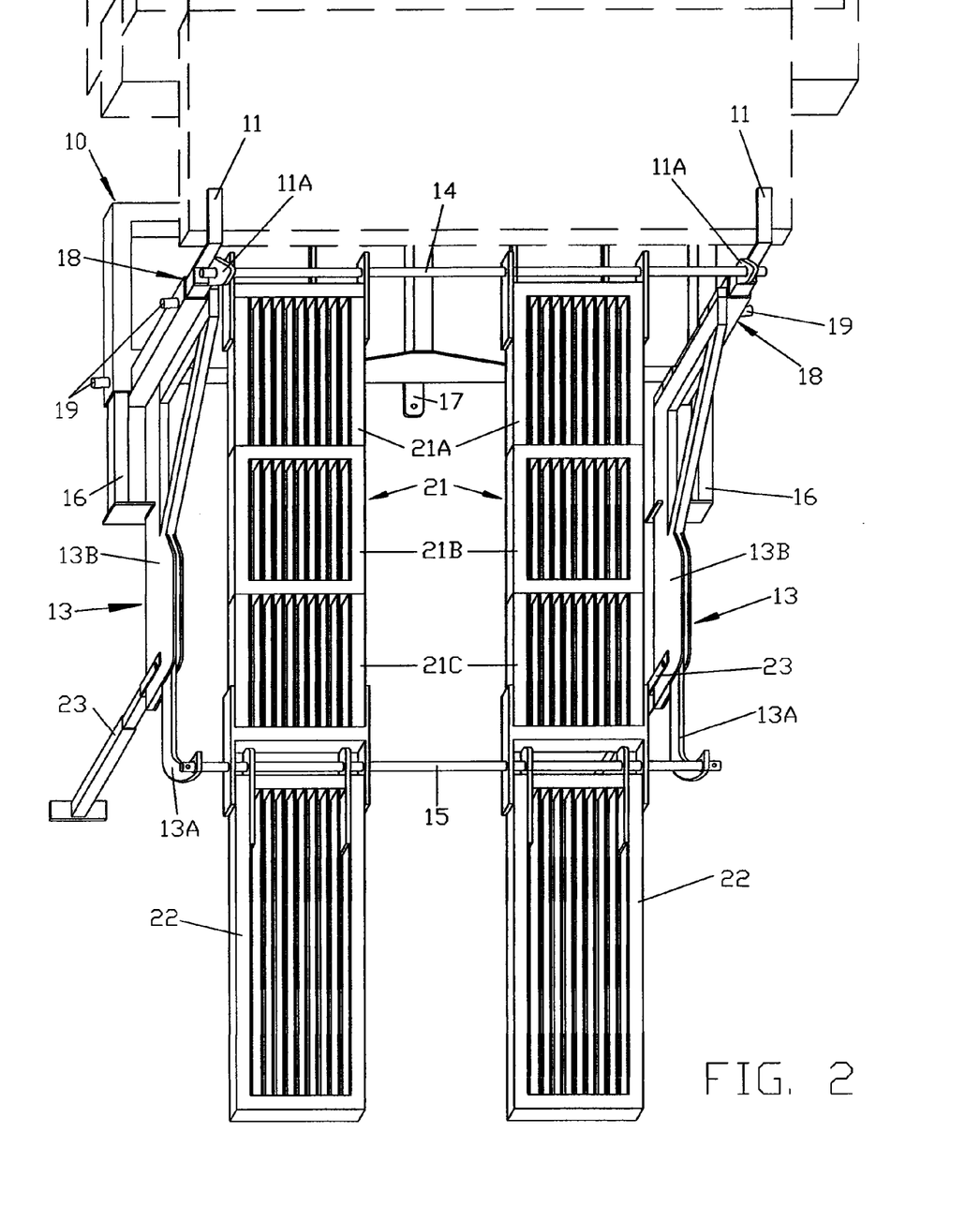
FIG. 2 illustrates a perspective view of the present invention in the open position when fully assembled and prepared to load cargo.

FIG. 2 illustrates a perspective view of the present invention in the open position when fully assembled and prepared to load cargo. FIG. 2 discloses one or more primary ramp grills 21 which are capable of being releaseably attached to the primary crossbar 14 and the secondary crossbar 15. In the preferred embodiment, two primary ramp grills 21 are used because two ramp grills are sufficient to load most cargo with four wheels. In the preferred embodiment, the primary ramp grills 21 are comprised of three attached sections. These sections are the upper section 21A, middle section 21B, and lower section 21C. These sections are attached to each other to create an arch. This arch configuration helps distribute the load weight between the primary crossbar 14 and the secondary crossbar 15 while still allowing for vehicles with small diameter tires to be loaded. Many different arch configurations may be used. Arches that extend only slightly into the vertical plane do not distribute weight as well and are therefore not as stable. However, arches that extend farther into the vertical plane are more difficult to store during transit and create a steeper incline for cargo loading purposes. In the preferred embodiment, a vertical arch extending approximately three inches into the vertical plane is used.

FIG. 2 also discloses one or more secondary ramp grills 22. One end of the secondary ramp grills 22 should be capable of being releaseably attached to the secondary crossbar 15. The other end of the secondary ramp grills 22 should be placed on the ground for cargo loading purposes. When weight is placed on either the secondary ramp grills 22 or the primary ramp grills 21, the weight is mechanically transferred to the secondary crossbar 15 and into each swing arm projection 13A. The weight of any load placed thereon pushes the secondary crossbar 15 toward the ground which has the effect of locking both the primary ramp grills 21 and the secondary ramp grills 22 in position relative to one another to prevent shifts during loading. In the preferred embodiment, both the primary ramp grills 21 and the secondary ramp grills 22 have serrated edges to reduce the likelihood that the tires of any vehicle being loaded will slip off of the ramp. The serrated edges should not be so sharp as to risk puncturing the tires of the load.

FIG. 2 also discloses ground supports 23. In the preferred embodiment, the present invention includes two ground supports 23 which are releaseably attached to the horizontal swing section of the swing arm units 13B. In the preferred embodiment, one ground support 23 is attached to each swing arm unit 13. The ground supports 23 are not long enough to touch the ground when no cargo is present on the present invention. The ground supports 23 only touch the ground when the weight of a heavy load is partially transferred to the pickup truck causing the trucks bed to move closer to the ground. The ground supports 23 each provide an extra point to distribute weight to the ground and increase the overall stability of the device during certain points of the loading process. One skilled in the art will see that several configurations of supports could be used and this disclosure is intended to and does include those configurations. The preferred embodiment of the present invention does not require the use of ground supports 23 for trucks that are half ton models or larger. Trucks of that size can support the weight of the cargo to be loaded without the need of additional support.

FIG. 3 illustrates a perspective view of the present invention in the closed position when fully disassembled and stored for transit. FIG. 3 also discloses a repository member 30 which is present in the preferred embodiment. The repository member 30 should be removably attached to the storage base 10A and should be capable of storing other components. The repository member 30 further comprises an upper surface and a lower surface and should also comprise one or more access panels 30A for securely loading and unloading components into the repository member 30. In the preferred embodiment, the repository member has two access panels 30A, one located on each end of the repository member 30. The access panels 30A should be attached to the repository member 30 in such a way that they can be securely attached and closed during transit, but either movable or removable for the purpose of loading components into the repository member 30. In the preferred embodiment, the repository member 30 comprises a notch in the lower surface that accepts the vehicle attachment member 12. This prevents the repository member from sliding during transit. In the preferred embodiment, the repository member should extend beyond storage base 10A on the ends containing the access panels 30A. This allows the user to open the access panels without coming into contact with other components.

The repository member 30 also serves as additional cargo space. When the truck tailgate has been raised and the present invention placed in the closed position, various items may be placed on the upper surface of the repository member 30 and tied in place. These items could include ice chests, hunting gear, camping gear, or other items useful in the outdoors.

In the closed position, the primary grills 21, secondary grills 22, primary crossbar 14, secondary crossbar 14, and ground supports 23 have all been securely loaded into the repository member 30. The support extensions 16 have retracted into the storage base 10A. The swing arm units 13 have also been pivoted horizontally to place them parallel with the repository member 30. The swing arm lock 17 is then used to secure the swing arm units 13 to prevent them from moving back to the open position during transit.

FIG. 3 also discloses a plurality of repository fins 31 which are affixed to the repository member 30. The repository fins 31 can be used as attachment points when storing ice chests, camping gear, tools, or other items on the upper surface of the repository member 30 when the tailgate of the truck is up.

These items would have to be removed during loading and unloading of cargo

Figure 4:
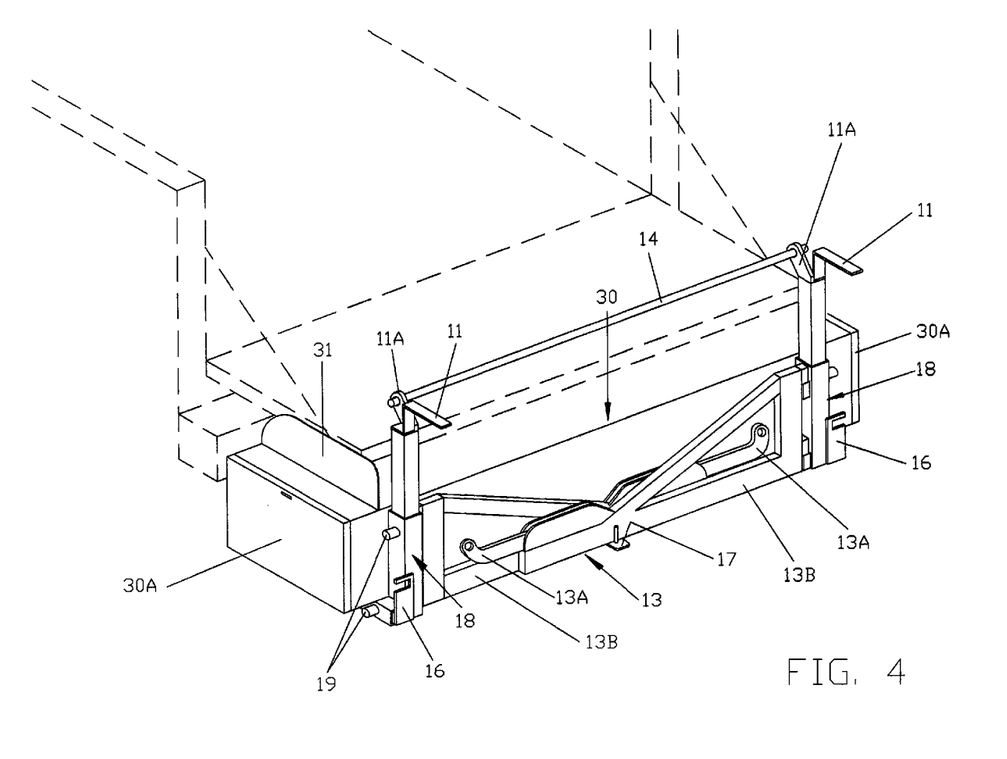
FIG. 4 illustrates a perspective view of the present invention in a closed position with the tailgate locks in the raised position above the lowered tailgate of the truck.

FIG. 4 illustrates a perspective view of the present invention in a closed position with the tailgate locks 11 in a raised position above the lowered tailgate of the truck. In the preferred embodiment, the tailgate locks 11 can be raised and rotated to place the crossbar attachment 11A of each tailgate lock 11 above the lowered tailgate. This allows the user to place the primary crossbar 14 above the tailgate. In this manner, the user can place cargo on the tailgate and use the primary crossbar 14 to prevent items from sliding off of the back of the lowered tailgate. The primary crossbar can also be used as an additional anchor point to tie cargo to the present invention.

Figure 5:
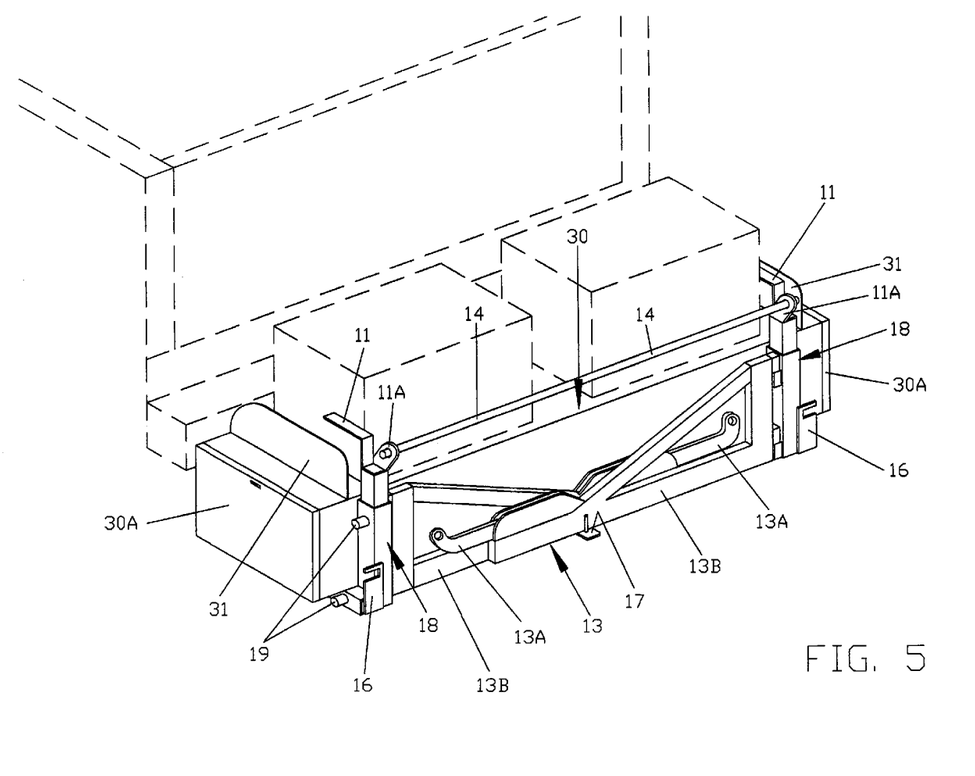
FIG. 5 illustrates a perspective view of the present invention in a closed position used to store cargo on top of the repository member.

FIG. 5 illustrates a perspective view of the present invention in a closed position used to store cargo on top of the repository member 30. In this position, the tailgate locks 11 have been temporarily removed, the tailgate of the truck has been raised, and the tailgate locks 11 have been replaced. This has the effect of creating storage space on the upper surface of the repository member 30. In this manner, the user can place cargo on the upper surface of the repository member 30. The tailgate locks 11, the repository fins 31, the primary crossbar 14, and the bumper of the truck prevent the cargo from sliding off of the repository member 30 in any direction. The primary crossbar 14 can also be used as an additional anchor point to tie cargo to the present invention.

Figure 6:
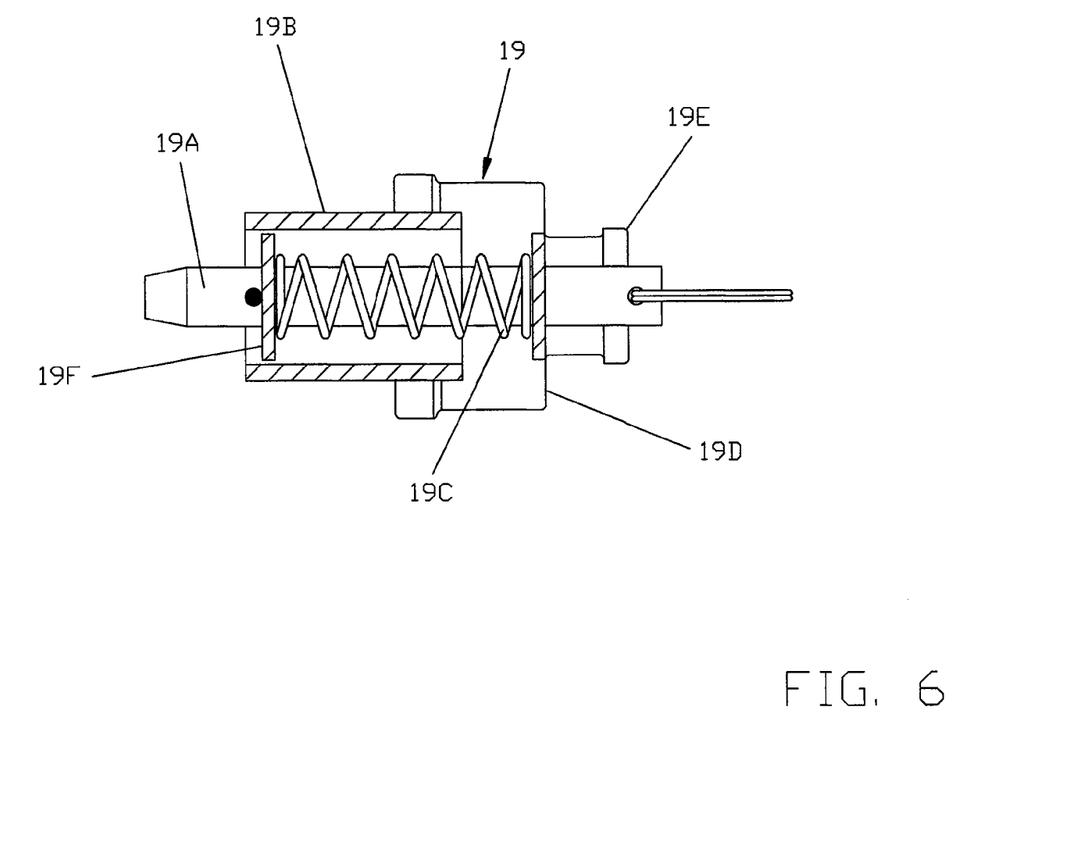
FIG. 6 illustrates a cross-sectional view of the spring loaded attachment pins used in the preferred embodiment of the present invention.

FIG. 6 illustrates a cross-sectional view of the spring loaded attachment pins 19 used in the preferred embodiment of the present invention. The spring loaded attachment pin 19 further comprises a plunger 19A with both a proximate and distal end, a hollow inner casing 19B with two ends, a hollow outer casing 19D with an inner wall and an outer wall, a spring member 19C with two ends, a handle 19E, and a catch 19F. The handle 19E is attached to the proximate end of the plunger 19A and the catch 19F is attached around the distal end of the plunger 19A, leaving a portion of a distal end of the plunger 19A protruding beyond the catch 19F. The outer casing 19D is placed around the first end of the inner casing 19B and attached so that the hollow areas of each component create a continuous open space. The plunger 19A is placed through both the outer casing 19D and the inner casing 19B. The handle 19E is placed against the outer wall of the outer casing 19E with the distal end of the plunger 19A protruding beyond the second end of the inner casing 19B. The spring member 19C is placed around the plunger 19A with a first end in contact with the inner wall of the outer casing 19D and the second end in contact with the catch 19F. The spring 19C should be selected to create tension between the catch 19F and the inner wall of the outer casing 19D. In this configuration, the plunger 19A is extended under normal circumstances, but can be retracted inside the inner casing 19B when the user pulls the handle 19E.

The spring loaded attachment pin 19 can be used to releaseably attach or retain two components in position relative to each other. It can be used any time an inner component can slide into an outer component. When used, the inner casing 19B is attached to an opening in the outer component with the outer casing 19D exposed. The inner component must have an opening as well. When the user pulls the handle 19E, the plunger 19A retracts allowing the inner component to move relative to the outer component. When the handle 19E is released, the spring member 19C extends the plunger 19A into any available opening in the inner component. In this manner, the inner component is retained in position relative to the outer component by the plunger 19A of the spring loaded attachment pin 19 and said inner component can be adjusted or removed without the use of additional tools.

The method of using the present invention will now be discussed. Although not meant as a limiting example, the process for loading an all terrain vehicle (ATV) into the back of a pickup using the present invention is described. It should be noted that the present invention may be used to load ATV's, motorcycles, snowmobiles, lawn equipment, jet skis, and many other devices. The only difference is that some devices require more ramps than others. For purposes of this example, the present invention is assumed to be in the closed position as shown in FIG. 3. The vehicle attachment member 12 should be releaseably attached to the hitch of the truck in order to attach the storage bed unit 10 to the truck. In the event the user wishes to releaseably attach the present invention to the truck without the use of a mechanical lift, the user may remove all of the components from the repository member 30 prior to attachment in order to make the device lighter. The tailgate of the truck should then be lowered. The tailgate locks 11 should then be rotated to secure the tailgate and prevent unwanted movement during loading. The primary crossbar 14 may then be removed from the repository member 30 and releaseably attached to the crossbar attachments 11A on each of the vertical support 18. The swing arm units 13 should be unsecured from the swing arm lock 17. The swing arm units 13 should then be pivoted to a position that is perpendicular to the tailgate of the truck. The secondary crossbar 15 may then be removed from the repository member 30 and releaseably attached to the swing arm projections of the swing arm units 13A. The support extensions 16 should be telescoped out from the storage base 10A along the horizontal swing section of the swing arm units 13B for increase stability. The primary ramp grills 21 should be removed from the repository member 30 and be releaseably attached to the primary crossbar 14 and the secondary crossbar 15. The secondary ramp grills 22 should also be removed from the repository member 30. One end of each secondary ramp grill 22 should be releaseably attached to the secondary crossbar 15 and the other end should be placed on the ground. The ground supports 23 may also be removed from the repository member 30 and be releaseably attached to the horizontal swing section of each swing arm units 13B. At this point, the present invention is fully assembled in the open position as shown in FIG. 2 and is ready to be used to load the ATV.

The user may then drive the ATV over the secondary ramp grills 22 and then over the primary ramp grills 21. Due to the ground supports 23 and the support extensions 16 the ramp grills will remain stable during loading, even if the ground in the loading area is not flat Additionally, the weight of the ATV will force the swing arm projections 13A down, locking the ramps in place. After the ATV has been loaded, the user can remove the primary ramp grills 21, secondary ramp grills 22, primary crossbar 14, secondary crossbar 15, and the ground supports 23. Each of these items may then be placed back in the repository member 30. The swing arm projections 13A may then be pivoted and secured to the horizontal swing section 13B. The support extension 16 should be retracted into the storage base 10A and the swing arm units 13 may then be pivoted back to a closed position and secured by the swing arm lock 17. In this manner, the ATV is loaded into the truck bed, and no piece of the invention must take up any space in the truck bed or the cab of the truck.

In the preferred embodiment, all of the components mentioned herein are made aluminum or steel. However, the components can be made of any material that is durable and strong enough to support the weight of the cargo to be loaded plus the weight of the user. Lighter materials are preferred because they allow the average user to lift the present invention, when disassembled, for attachment purposes without the aid of other mechanical lifts or devices. In the preferred embodiment, the entire invention may be disassembled and attached one piece at a time so that users without significant strength can still make use of the present invention.

It should be noted that the foregoing disclosure repeatedly refers to both pickup trucks, trucks, and automobiles and often uses the terms interchangeably. While the preferred embodiment of the present invention is intended to be used in conjunction with a pickup truck, one skilled in the art can appreciate that other embodiments of the present invention could be used with any vehicle with a receiver hitch. This disclosure is intended to and does encompass those embodiments and the terms pickup truck and truck should not be considered limiting from the broader phrase automobile.

It should be noted that the foregoing disclosure sometimes labels components with terms like front, rear, bottom, top, primary, secondary, side, horizontal, vertical, upper, lower, and the like. These terms are used for ease of identification purposes only and are not intended as limiting language. A person of ordinary skill in the art will understand that the orientation of many of the components contained herein can be changed to an equivalent structure without significantly affecting the overall function of the present invention. This disclosure is intended to cover and does cover all such equivalent embodiments.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

I claim:

1. A space saving automobile loading ramp system, comprising: a storage bed unit further comprising a vehicle attachment member capable of releaseably attaching said storage bed unit to an automobile, a storage base affixed to said vehicle attachment member for storing other components, and a plurality of vertical support members, each further comprising a lower portion attached to the storage base, and an upper portion, said vertical support members being capable of providing support to other components; a plurality of swing arm units, further comprising a horizontal swing section, and pivotally connected to the vertical support members; a primary crossbar capable of being releaseably attached to a plurality of the vertical support members; a secondary crossbar capable of being releaseably attached to a plurality of the swing arm units; one or more primary ramp grills capable of being releaseably attached to the primary crossbar and secondary crossbar; and one or more secondary ramp grills capable of being releaseably attached to the secondary crossbar.

2. The space saving automobile loading ramp system of claim 1, wherein each swing arm unit further comprises a swing arm projection which is pivotally connected to the horizontal swing section and capable of being releaseably attached to the secondary crossbar.

3. The space saving automobile loading ramp system of claim 1, further comprising a plurality of support extensions that are releaseably attached to and can telescope out from the storage base.

4. The space saving automobile loading ramp system of claim 1, wherein each vertical support member further comprises a tailgate lock which is releaseably attached to the upper portion of the vertical support member and is capable of securing the tailgate of an automobile.

5. The space saving automobile loading ramp system of claim 4, wherein each tailgate lock further comprises a crossbar attachment capable of being releaseably attached to the primary crossbar.

6. The space saving automobile loading ramp system of claim 1, wherein the primary ramp grills are comprised of three or more attached sections to distribute load weight between the primary crossbar and the secondary crossbar.

7. The space saving automobile loading ramp system of claim 1, further comprising at least one ground support releaseably attached to each swing arm unit.

8. The space saving automobile loading ramp system of claim 1, wherein the storage bed unit further comprises a repository member removably attached to the storage base for storing other components.

9. The space saving automobile loading ramp system of claim 8, wherein the repository member further comprises one or more access panels for securely loading and unloading components into the repository member.

10. The space saving automobile loading ramp system of claim 9, wherein the repository member further comprises a plurality of repository fins affixed to the repository member.

11. The space saving automobile loading ramp system of claim 1, wherein the storage bed unit further comprises a swing arm lock, attached to the storage base, capable of securing the swing arm units.

12. The space saving automobile loading ramp system of claim 4, further comprising a spring loaded attachment pin used to releaseably attach a first tailgate lock to a first vertical support member.

13. The space saving automobile loading ramp system of claim 1, further comprising a vehicle attachment member support affixed to the vehicle attachment member and the storage base.

14. The method of using a space saving automobile loading ramp system with an automobile comprising;
    releaseably attaching a storage bed unit to an automobile;
    lowering an automobile tailgate;
    releaseably attaching a primary crossbar to a vertical support member;
    unsecuring a swing arm unit from a swing arm lock;
    pivoting the swing arm unit to a position that is perpendicular to the automobile tailgate;
    releaseably attaching a secondary crossbar to the swing arm unit;
    releaseably attaching a plurality of primary ramp grills to the primary crossbar and the secondary crossbar; and
    releaseably attaching a plurality of secondary ramp grills to the secondary crossbar.

15. The method of using a space saving automobile loading ramp system of claim 14, further comprising securing the automobile tailgate with a tailgate lock.

16. The method of using a space saving automobile loading ramp system of claim 14, further comprising releaseably attaching a ground support to the swing arm unit.

17. The method of using a space saving automobile loading ramp system of claim 14, wherein the swing arm unit comprises a horizontal swing section, and
    wherein the method further comprises extending a support extension along the horizontal swing section of the swing arm units.

* * * * *